United States Patent [19]
Arnold et al.

[11] Patent Number: 5,197,420
[45] Date of Patent: Mar. 30, 1993

[54] CAMSHAFT ADJUSTER AND TENSIONER

[75] Inventors: Gerd Arnold, Nauheim; Markus Lienkamp, Bad Schwalbach; Albert Schweikard, Appenheim, all of Fed. Rep. of Germany

[73] Assignee: General Motors Corporation, Detroit, Mich.

[21] Appl. No.: 808,514

[22] Filed: Dec. 16, 1991

[30] Foreign Application Priority Data

Dec. 24, 1990 [DE] Fed. Rep. of Germany ....... 4041785

[51] Int. Cl.$^5$ .............................. F01L 1/34; F01L 1/04
[52] U.S. Cl. ................................ 123/90.15; 123/90.31; 474/110; 474/111
[58] Field of Search .............. 123/90.15, 90.17, 90.31; 474/110, 111, 117, 138

[56] References Cited

U.S. PATENT DOCUMENTS

| 2,963,918 | 12/1960 | Blakstad | 474/111 |
| 3,888,217 | 6/1975 | Hisserich | 123/90.15 |
| 3,964,331 | 6/1976 | Oldfield | 474/111 |
| 4,716,864 | 1/1988 | Binder | 123/90.31 |
| 4,940,447 | 7/1990 | Kawashima et al. | 474/110 |
| 5,088,457 | 2/1992 | Ferrazzi | 123/90.31 |
| 5,109,813 | 5/1992 | Trzmiel et al. | 123/90.15 |
| 5,117,786 | 6/1992 | Trzmiel et al. | 123/90.31 |
| 5,120,278 | 6/1992 | Trzmiel et al. | 474/110 |

FOREIGN PATENT DOCUMENTS

| 0445356 | 9/1991 | European Pat. Off. |
| 3534446A1 | 4/1987 | Fed. Rep. of Germany |
| 3421028C2 | 1/1990 | Fed. Rep. of Germany |

OTHER PUBLICATIONS

Porsche 968, Automotive Engineering, Nov. 1991, pp. 73-74.

Primary Examiner—E. Rollins Cross
Assistant Examiner—Weilun Lo
Attorney, Agent, or Firm—Robert J. Outland

[57] ABSTRACT

A camshaft adjuster mounted between a taut strand and a slack strand of a chain connecting an intake camshaft to an exhaust camshaft has two tensioning shoes which are urged by a spring away from each other and against the inner sides of the chain strands. One tensioning shoe is mounted on a reciprocable piston within which a plunger carrying the other tensioning shoe is slidable against the force of the spring. The piston is moved against the taut strand by pressurization of a pressure chamber through a nonreturn valve and the plunger is moved with the piston so that the taut and slack strands are moved together and compression of the tensioning spring is thereby maintained relatively constant. A damping chamber may be provided with throttling bores in the piston and/or plunger to control the damping effect.

8 Claims, 1 Drawing Sheet

CAMSHAFT ADJUSTER AND TENSIONER

TECHNICAL FIELD

The invention relates to a camshaft adjuster of the type for guiding or tensioning a chain driven by a first camshaft and driving a second parallel camshaft wherein the adjuster is mounted between the two strands of the chain. The camshaft adjuster has two tensioning shoes that press against the chain from the inside. One of the shoes is rigidly connected to a piston that can move transversely to the chain by hydraulic pressure applied to a pressure chamber.

BACKGROUND

A camshaft adjuster of this type is the subject of DE-C-34 21 028 and corresponding U.S. Pat. No. 4,716,864. These documents describe two different camshaft adjusters, both of which are mounted between the two strands of a chain. In the first camshaft adjuster, one tensioning shoe is rigidly attached to the housing. The opposing tensioning shoe can be moved a certain distance out of a cylinder by means of a piston by applying pressure to a pressure chamber, so that its distance from the fixed tensioning shoe can change and thus cause a change in the chain tension. Allegedly, adjustment of the valve timing also is possible by changing the chain tension.

In the second embodiment of a camshaft adjuster described in DE-C 34 21 028 both tensioning shoes are connected to a single piston, so that both tensioning shoes always move the same distance in one direction. In this way the chain tension, if any, remains unchanged, but the timing of the driven camshaft can be changed by shortening one strand of the chain and lengthening the other strand by the same amount. However, maintenance of a prescribed chain tension is important for the life of chain drives and for low-noise operation, so it is desirable to provide a tensioning mechanism in addition to the described camshaft adjuster, but there is no provision for this in the cited document. In many cases, however, there is no room for such a tensioning device, especially between the strands of the chain, if the camshaft adjuster is already located there.

SUMMARY OF THE INVENTION

An object of the invention is to provide a camshaft adjuster that continuously provides a predetermined chain tension with a minimal space requirement and at the same time can optimally perform a function of changing the valve timing.

In accordance with the invention, this object is achieved by using a spring to support the second tensioning shoe against the piston that carries the first tensioning shoe. This enables the camshaft adjuster to exert continuous tension, the force of which is determined by the spring, on the slack strand of the chain. This tension is maintained even when the camshaft adjuster is not being acted upon by pressure. The tension does not change even when the application of pressure causes the tensioning shoe of one of the pistons to press one strand of the chain outward, because whatever distance the piston moves, the spring support on the piston moves to the same extent, so that the chain strand on the piston side can follow a flatter course and can thus make a certain amount of chain available to the chain strand on the opposite side.

In a desirable embodiment of the invention, a nonreturn valve that opens toward a pressure chamber is mounted in a connection between a source of pressure fluid and the pressure chamber. To adjust the camshaft, a camshaft adjuster of this type takes advantage of the fact that the camshaft moment, or rotational force, is approximately sinusoidal and has a positive mean value. Depending on the speed of rotation, minima occur or the moment may even pass through zero, at which the chain force in the taut strand is zero. Because of the nonreturn valve of the invention, the taut strand of the chain can be adjusted by supplying oil to the pressure chamber of the camshaft adjuster during the periods when the moment passes through zero. If the chain force cyclically assumes a high value, then the nonreturn valve closes and hydraulic support is provided. Therefore, adjustment of the taut strand of the chain is possible with a small piston diameter and low hydraulic pressures. A small piston diameter in turn makes it possible for the camshaft adjuster to be designed small, which is advantageous for mounting it between the strands of the chain.

In a camshaft adjuster in accordance with one possible embodiment of the invention, the piston is designed as a hollow piston that is movably mounted in a stationary housing. The first tensioning shoe is seated on the closed end of the piston and a plunger carrying the other tensioning shoe telescopes axially into the piston with a close fit. The pressure chamber is then located between the housing, the annular surface of the piston and the plunger.

Vibrations in the system can be effectively damped by forming a space within the piston as a hydraulic damping chamber which can be filled with pressure fluid independently of the pressure chamber via a nonreturn valve that opens towards the damping chamber.

The damping device can be obtained by forming the plunger as a hollow piston and providing its end face, which carries the second tensioning shoe, with a throttling bore that allows oil to escape from the damping chamber.

The function of the damping device may be further improved by providing a closed end face of the hollow piston, which end face carries the first tensioning shoe, with a throttling bore that allows oil to escape from the damping chamber.

Fluid pressurization of the camshaft adjuster can be controlled very simply by providing a 3/2-way valve for pressurizing the pressure chamber with pressure fluid. The 3/2-way valve connects the pressure chamber to a pressureless return in the nonflow state and to a pressure fluid source in the flow state. The oil pressure system usually present in an automotive engine can be used as the pressure fluid source.

Numerous embodiments of the invention are possible.

BRIEF DRAWING DESCRIPTION

The basic principles of the invention are explained on the basis of the embodiment shown in the drawings wherein.

DETAILED DESCRIPTION

Figure 1:
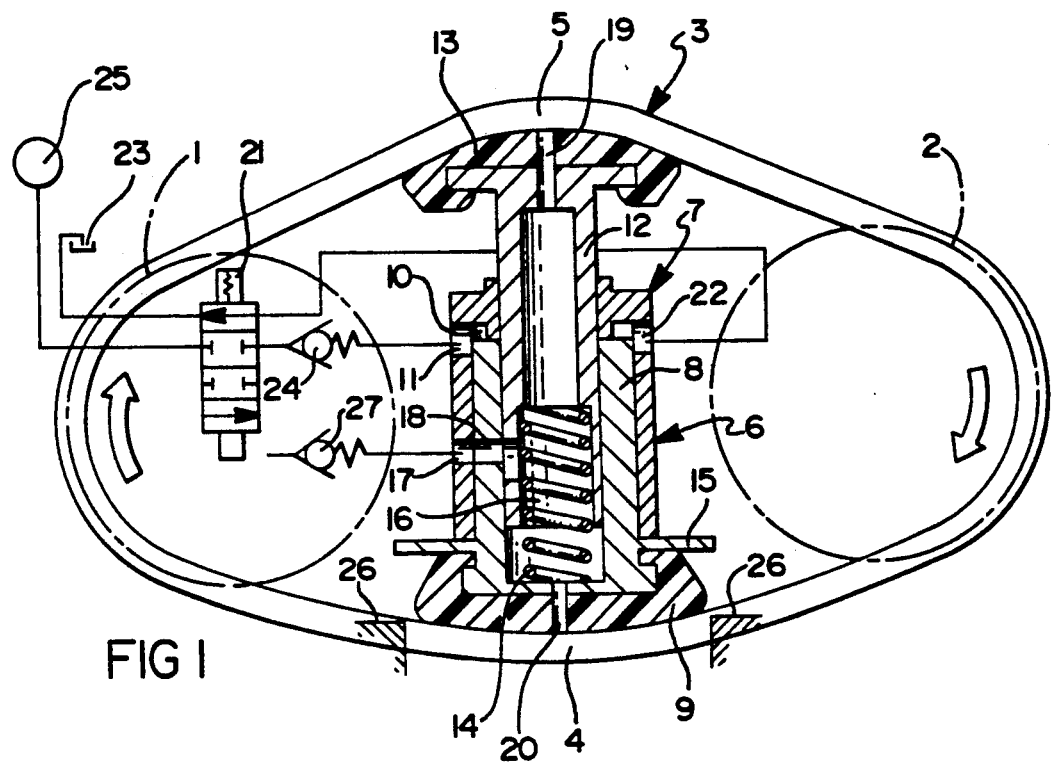
FIG. 1 shows a chain drive with a camshaft adjuster in accordance with the invention shown in cross section in the unpressurized state.

In FIG. 1 a broken line is used to represent a sprocket wheel 1 mounted on an exhaust camshaft (not shown). The sprocket wheel 1 is driven, in a manner not shown here, by the crankshaft (also not shown) of the internal combustion engine. Parallel to this sprocket wheel 1, another sprocket wheel 2, which likewise is represented by a broken line, is mounted on the intake camshaft. This sprocket wheel 2 is driven clockwise by a chain 3, which may be a roller chain. The lower section of the chain 3 in the drawing is thus the taut strand 4, while the upper section of the chain represents the slack strand 5.

A camshaft adjuster 6 in accordance with the invention is located between the taut strand 4 and the slack strand 5 of the chain 3. The camshaft adjuster 6 has a stationary cylindrical housing 7 which may be mounted on the engine cylinder head (not shown). A piston 8, which is hollow, can move axially in the cylindrical housing 7. A tensioning shoe 9 that rests against the inside of the taut strand 4 is mounted on a closed end of the piston 8, which is the lower end in the drawing. To produce movement in the piston 8, the housing 7 has a pressure chamber 10 above its annular end surface facing away from the tensioning shoe 9. The pressure chamber 10 is supplied with pressure fluid via a pressure fluid connection 11.

A plunger 12, which is also hollow with an open end, moves axially in hollow piston 8. A tensioning shoe 13 is mounted on a closed end of the plunger 12 that extends out of the piston 8. This tensioning shoe 13 rests against the inside of the slack strand 5 of the chain 3. Both tensioning shoes 9, 13 are made of wear-resistant and heat-resistant plastic. The chain 3 is a roller chain, and its rollers run over the plastic, so that no sliding friction develops. The system is prevented from twisting by externally mounted rails that guide the tensioning shoes 9, 13.

A spring 14 is mounted inside the piston 8. One end of the spring 14 is supported against the piston 8, and the other end is supported against the plunger 12. In this way, the tensioning shoe 13 applies tension to the slack strand 5. In the unpressurized state of the camshaft adjuster 6 shown in FIG. 1, the other tensioning shoe 9 is pushed with piston 8 into the housing 7 until an outwardly directed flangelike ring 15 mounted on the piston 8 contacts the lower end of the housing 7 from below.

The interior of the piston 8 is designed as a damping chamber 16, which is filled with pressure fluid via a pressure medium connection 17 in the housing 7 and a supply port 18 in the piston 8. The damping chamber 16 communicates with the outside via a throttling bore 19, 20 in each tensioning shoe 9, 13. The damping chamber 16 is filled via a nonreturn valve 27 that opens toward the damping chamber 16.

The pressurization of pressure chamber 10 with pressure fluid is controlled by an electromagnetically operated 3/2-way valve 21. The nonflow position of the 3/2-way valve 21 shown in FIG. 1 represents the late position, the power and idle position and the antifriction position. In this position, a pressure medium connection 22 of the pressure chamber 10 is connected to a pressureless return 23 via the 3/2-way valve 21. When the 3/2-way valve 21 is switched, then this connection is closed, and the pressure fluid connection 11 of the pressure chamber 10 is connected to a pressure fluid source 25 via a nonreturn valve 24 that opens towards this pressure chamber 10. The pressure fluid source 25 can be the oil pump of the engine, so that the available oil pressure system of the engine can be utilized in a simple way. When the pressure chamber 10 is pressurized, the piston 8 moves downward, as shown in FIG. 1, until its ring 15 hits the stop 26. This stop 26 can be designed as an adjustable stop to allow variable design of the camshaft adjustment system. When the piston 8 moves downward, the tensioning shoe 9 moves with it and presses the taut strand 4 downward, which results in adjustment of the phase angle or timing of the intake camshaft.

Figure 2:
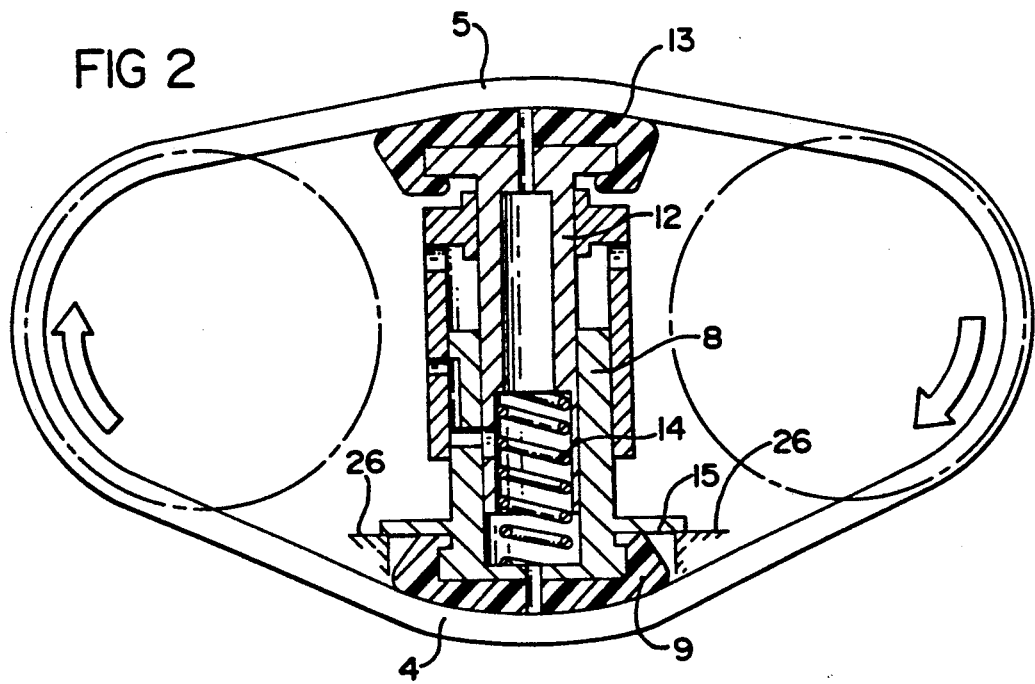
FIG. 2 shows the same system as in FIG. 1 but in the pressurized state.

FIG. 2 shows the extended position of the piston 8. The ring 15 of the piston 8 rests against the stop 26. The spring 14 has followed the piston 8, so that the plunger 12 was able to move downward, and the slack strand 5 is therefore pressed upward by the tensioning shoe 13 to a lesser extent, corresponding to the additional distance the tensioning shoe 9 has pushed the lower strand 4 downward.

What is claimed is:

1. A camshaft adjuster and tensioner for a drive chain having taut and slack strands driven by a first camshaft and driving a second parallel camshaft, said adjuster being mounted between the two strands of the chain and having two tensioning shoes that press against the chain from the inside, wherein one of the shoes is rigidly connected to a piston movable transversely to the chain by hydraulic pressure applied to a pressure chamber and the second tensioning shoe is urged by a spring acting against the piston carrying the first tensioning shoe.

2. A camshaft adjuster and tensioner as in claim 1 wherein a nonreturn valve that opens toward the pressure chamber is mounted in a connection between a pressure fluid source and the pressure chamber.

3. A camshaft adjuster and tensioner as in claim 1 wherein the piston is hollow with an open annular end and an opposite closed end, the piston being reciprocably mounted in a stationary housing, the first tensioning shoe is seated on the closed end of the piston, a plunger carrying the other tensioning shoe is reciprocably received in the piston with a close fit and the pressure chamber is defined by the housing, the annular end surface of the piston and the plunger.

4. A camshaft adjuster and tensioner as in claim 3 wherein the interior of the hollow piston defines a hydraulic damping chamber and connecting means are provided to fill the damping chamber with pressure fluid independently of the pressure chamber, the connecting means including a nonreturn valve that opens toward the damping chamber.

5. A camshaft adjuster and tensioner as in claim 4 wherein the closed end of the hollow piston includes a throttling bore that allows oil to escape from the damping chamber.

6. A camshaft adjuster and tensioner as in claim 4 wherein the plunger is also hollow and has a closed end which carries the second tensioning shoe and an open end within the damping chamber, the plunger closed end including a throttling bore that allows oil to escape from the damping chamber.

7. A camshaft adjuster and tensionner as in claim 6 wherein the closed end of the hollow piston, which carries the first tensioning shoe, also includes a throttling bore that allows oil to escape from the damping chamber.

8. A camshaft adjuster and tensioner as in claim 2, wherein an electromagnetic 3/2-way valve in the pressure chamber connection controls pressurization of the pressure chamber with pressure fluid by selectively connecting the pressure chamber with a pressureless return or with the pressure fluid source.

* * * * *